United States Patent [19]

Childre

[11] Patent Number: 5,388,776
[45] Date of Patent: Feb. 14, 1995

[54] FISHING REEL AND FEATHERING ASSEMBLY THEREFOR

[75] Inventor: Casey J. Childre, Foley, Ala.

[73] Assignee: Team Lew's, Inc., Foley, Ala.

[21] Appl. No.: 41,835

[22] Filed: Apr. 1, 1993

[51] Int. Cl.$^6$ ............................................... A01K 89/027
[52] U.S. Cl. ..................................................... 242/239
[58] Field of Search .............. 242/234, 235, 236, 237, 242/238, 239, 240

[56] References Cited

U.S. PATENT DOCUMENTS

| | | |
|---|---|---|
| 2,230,940 | 2/1941 | Ellsworth ........................... 242/323 |
| 2,479,826 | 8/1949 | Frick . |
| 2,838,922 | 6/1958 | Gift . |
| 2,941,748 | 6/1960 | Matthiesen . |
| 2,965,330 | 12/1960 | Hoekstra . |
| 3,059,873 | 10/1962 | Hull . |
| 3,152,771 | 10/1964 | Maury et al. ....................... 242/240 |
| 3,176,930 | 4/1965 | Miller et al. . |
| 3,185,405 | 5/1965 | Hull . |
| 3,794,264 | 2/1974 | Hull . |
| 4,285,476 | 8/1981 | Baenziger . |
| 4,361,293 | 11/1982 | Baenziger . |
| 4,362,763 | 12/1982 | Puryear et al. . |
| 4,448,367 | 5/1984 | Puryear et al. . |
| 4,451,102 | 5/1984 | Puryear . |
| 4,637,569 | 1/1987 | Swisher .............................. 242/239 |
| 4,760,974 | 8/1988 | Swisher .............................. 242/240 |
| 5,213,279 | 5/1993 | Puryear .............................. 242/239 |

*Primary Examiner*—Katherine Matecki
*Attorney, Agent, or Firm*—Lockwood, Alex, Fitzgibbon & Cummings

[57] ABSTRACT

An improved spincast fishing reel includes a feathering assembly attached to the fishing reel rotor. The feathering assembly includes a plurality of line engaging members in the form of fibers or bristles angularly extending outwardly from the rotor into the space between the reel housing and the rotor. Each of these bristles present a surface which interferingly contacts the fishing line and are deflected by contact with the fishing line. When the line is cast, the fibers or bristles are moved into this contact with the line by actuation of the pushbutton on the reel. When so contacted, a feathering action is effected on the fishing line which may be selectively controlled by actuation of the thumb button.

29 Claims, 2 Drawing Sheets

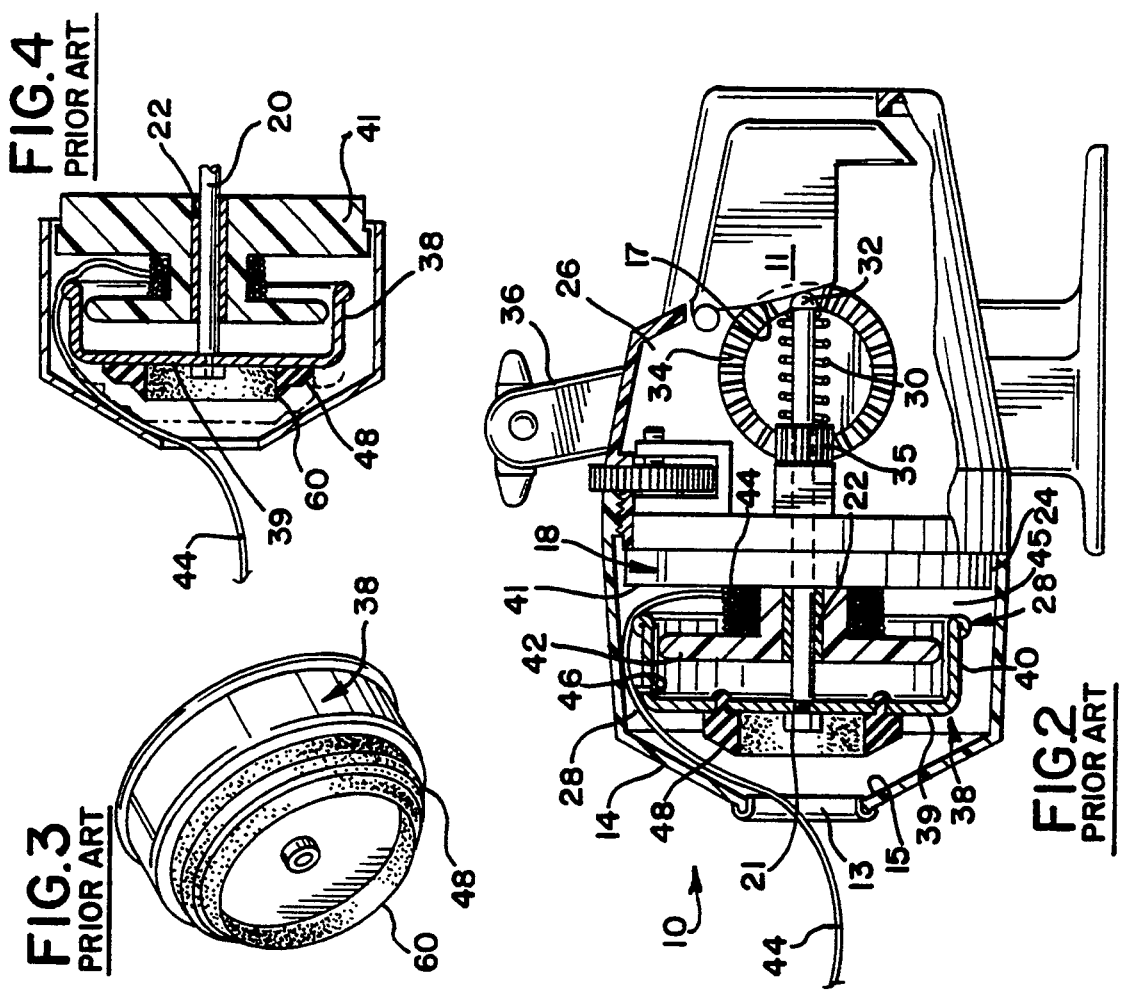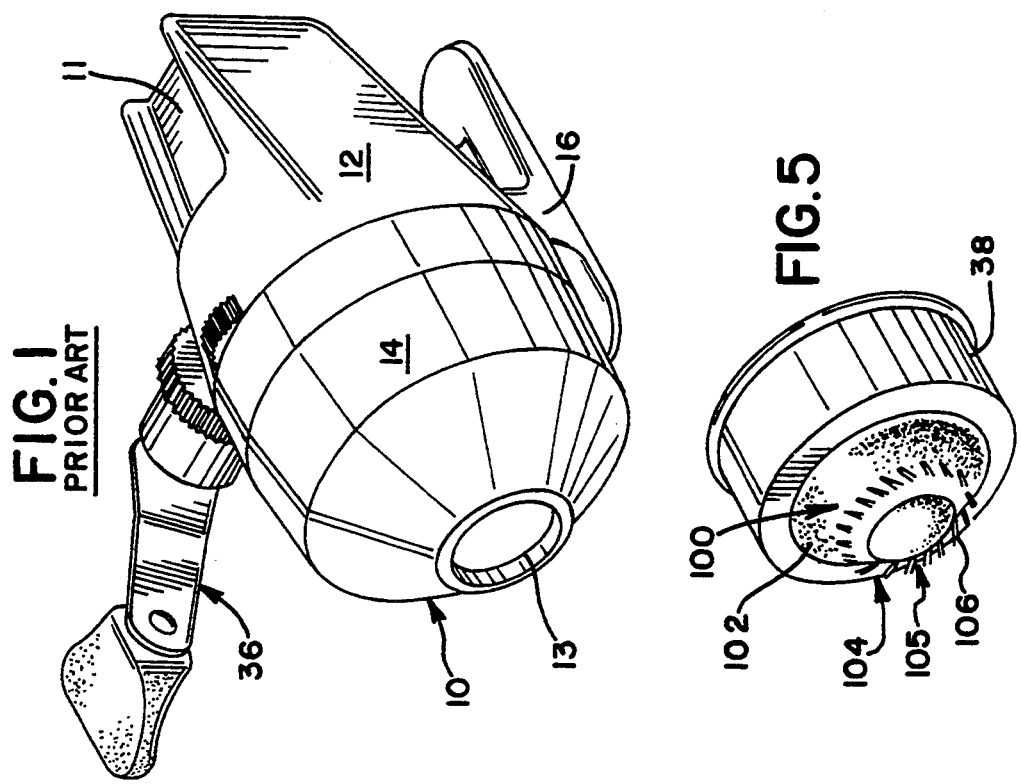

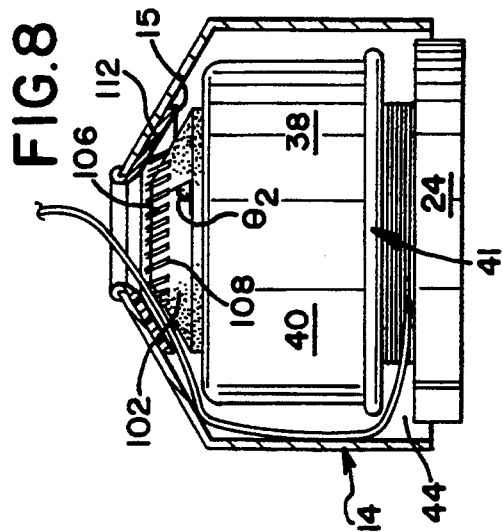
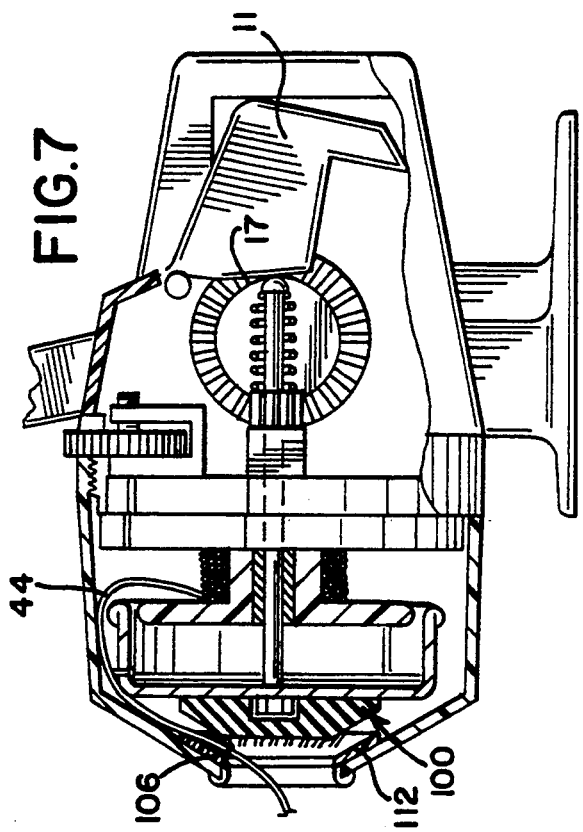
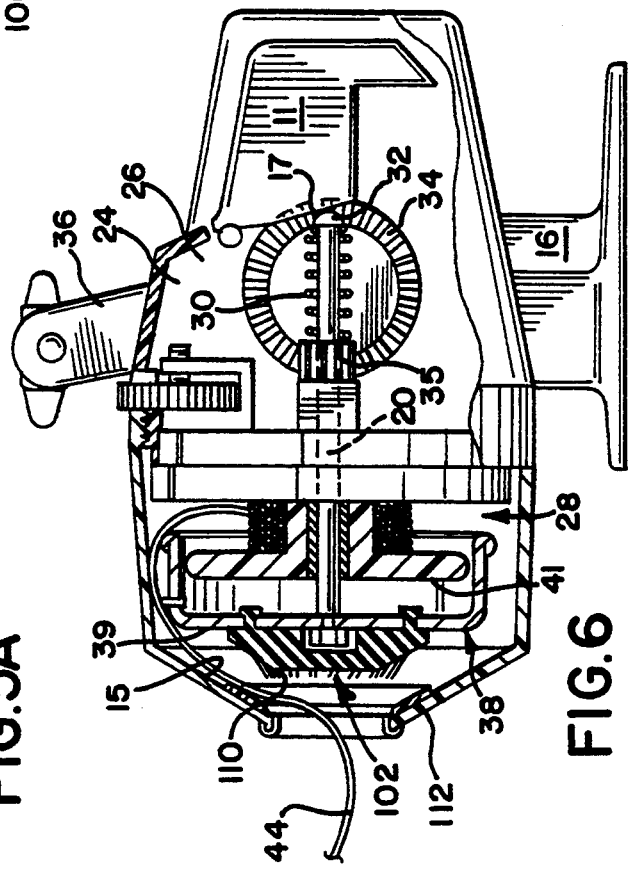
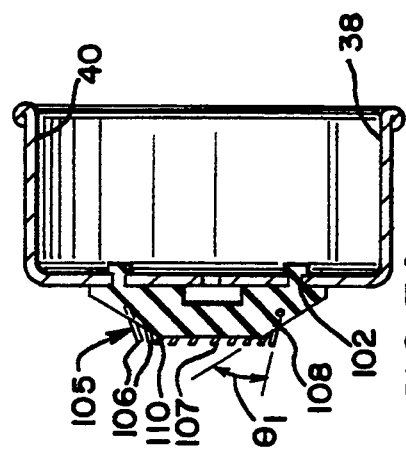

FISHING REEL AND FEATHERING ASSEMBLY THEREFOR

BACKGROUND AND SUMMARY OF THE INVENTION

The present invention relates generally to an improved fishing reel, and more particularly to a spincast fishing reel having an improved feathering assembly.

In fishing, it is desirable to be able to selectively control the discharge of line from the spool during a cast to permit accurate placement of the line or bait. Control over such line feed or discharge is typically effected by applying a drag or frictional force to the line as it uncoils from the reel line spool. The contact with the uncoiling line is termed "feathering" and such feathering permits the fisherman to control the horizontal extent of his cast.

In an open face spinning reel, feathering is conventionally achieved by contacting the fishing line with one or more fingers of his casting hand. The fisherman gradually brings his finger(s) toward the line spool so that the line rubs against the finger and spool to apply a selective drag force to the uncoiling line. Similarly, in a bait casting fishing reel, where the line runs perpendicular to the axis of the reel and is exposed to the fisherman, he can feather his cast by applying his thumb to the spool as the line unwinds from it. This direct contact with the line permits the fisherman to "feel" the amount of pressure he applies to the line for feathering to control the horizontal extent of his cast.

However, spincast fishing reels are fishing reels in which a fishing line spool is contained within a reel housing. These reels typically having a thumb, or pushbutton, mechanism by which the fisherman can cast line from the reel. Direct contact between the fisherman and the line is impractical in a spincast fishing reel, largely because the reel cover which encloses the line spool is remote from the fisherman's hand. Additionally, the reel construction does not allow a fisherman to directly contact the line with his fingers to feather the line in the manner permitted by the spinning and bait casting reels described above.

Feathering has been previously accomplished in spincast reels by forcing the fishing line into contact with an object located on the rotor as the line unwinds from the line spool. The simplest spincast feathering devices have included a circular rubber friction ring affixed to the front face of the reel rotor. This friction ring is displaced with the rotor forwardly toward the reel cover when the spincast reel pushbutton is depressed. As it is displaced, the friction ring nears the inner surface of the reel cover and the line is captured between the friction ring and the interior surface of the reel cover. Contact with either or both of these elements induces a drag on the line by frictional contact which slows down the line during casting. However, this structure can often result in a sudden interruption of the travel of the line off of the line spool which causes the bait or line to be "jerked" rearwardly in flight. Accurate control is not possible using the braking ring above.

There have been some attempts to produce a reel structure having a feathering device which gives a greater degree of control of feathering during casting. One such structure is described in U.S. Pat. No. 3,185,405, issued May 25, 1965, to R. D. Hull which utilizes a wire loop protruding forwardly from the rotor to provide a single contact surface which contacts the line as it unwinds spirally from the line spool. However, because only one contact surface or point is presented in such a construction, the friction applied is not continuous and thus the feathering effect obtained is, at best, an intermittent one.

Another known feathering device is one manufactured by the Brunswick Corporation on its "Positive Pick Up System" closed face spinning reel. The feathering device consists of a circular rubber ring having a thin rubber skirt extruding forwardly of the rotor. The rotor is brought toward the reel housing by actuating a lever and the thin skirt engages the unwinding line and applies friction to it. Although this type of feathering device is continuous, there is not much "give" in the skirt and thus jerking of the line or bait still may occur.

The present invention is directed to providing a line feathering assembly for a spincast fishing reel having an improved feathering capability and which overcomes the disadvantages of the prior art feathering devices detailed above. The present invention utilizes a base member with a plurality of elongated, discrete, line engaging members axially affixed to the front surface of a rotor and thereby moves in unison with the rotor, either backwardly or forwardly, when the reel pushbutton is depressed. The line engaging members may include a plurality of fibers, hairs or bristles embedded in the base member in a circular pattern and extending angularly out from the base member to provide a circular interference profile to the fishing line as it unwinds from the line spool. The line engaging members are selectively brought into contact with the uncoiling line when the reel pushbutton is pressed to advance the rotor toward the reel cover. Rather than a single interference surface being presented to the fishing line, the bristles provide a plurality of discrete interference surfaces which cooperate to provide a continuous frictional contact to the line each of which deflects under contact with the line.

Accordingly, it is a general object of the present invention to provide an improved spincast fishing reel which includes a feathering device that selectively applies drag to the fishing line as it unwinds from the line spool.

Another object of the present invention is to provide a spincast fishing reel with a feathering device attached to the rotor thereof wherein the feathering device includes a plurality of fibers or bristles extruding outwardly from the rotorhead and which provide a plurality of contact surfaces circumferentially disposed around the rotor which provide interruptions with the line as it exits from the reel housing.

It is yet another object of the present invention to provide a feathering assembly for a spincast fishing reel wherein the assembly includes a rotor having a plurality of elongated discrete line engaging members extending outwardly therefrom toward the reel housing whereby, when the reel pushbutton is depressed, the discrete line engaging members approach the reel housing inner surface and present a series of sequential interference surfaces which frictionally interfere with the line as it unwinds from the line spool and exits from the reel.

It is still another object of the present invention to provide a feathering device for converting an existing spincast fishing reel without a feathering device into a spincast fishing reel having a means for feathering the line cast from it.

These and other objects, features and advantages of the present invention will be clearly understood through a consideration of the following detailed description.

BRIEF DESCRIPTION OF THE DRAWINGS

In the course of the following detailed description, reference will be frequently made to the accompanying drawings in which:

FIG. 1 is a perspective view of a spincast fishing reel exemplary of known spincast fishing reels;

FIG. 2 is a sectional view of the fishing reel of FIG. 1;

FIG. 3 is a perspective view of a rotor component having a feathering device exemplary of the prior art;

FIG. 4 is a sectional view of a portion of a conventional spincast fishing reel utilizing the feathering device assembly of FIG. 3;

FIG. 5 is a perspective view of a rotor component having a feathering device constructed in accordance with the principles of the present invention;

FIG. 5A is a sectional view of the rotor-feathering device assembly of FIG. 5 taken along lines 5—5;

FIG. 6 is a sectional view of the fishing reel of FIG. 2 with the rotor-feathering device assembly of FIG. 5 in place within the fishing reel of FIG. 1;

FIG. 7 is the same as FIG. 6 showing the position of the rotor-feathering device assembly when it is advanced within the reel housing;

FIG. 8 is a top sectional view of the fishing reel of FIG. 7; and

FIG. 9 is a diagrammatic view of the fishing reel of FIG. 7 as seen from the front of the reel with the reel housing removed.

DETAILED DESCRIPTION OF THE PREFERRED EMBODIMENTS

Referring to FIGS. 1 and 2, a conventional spincast fishing reel, generally designated 10, is shown. The reel 10 is conventional in that it contains a reel body member 12 and a removable reel cover member 14 which engages the reel body 12. The reel body 12 has a foot 16 for mounting the reel to a fishing rod. When assembled, the reel body 12 and cover 14 define an overall reel cavity 18 which contains the various mechanical components of the reel 10. A wall, or abutment 24, divides this cavity 18 into two separate smaller cavities, a reel rear gear cavity 26 and a forward spool cavity 28.

A shaft 20 extends through the wall 24 and is supported therein by a sleeve bearing 22. The bearing 22 permits both axial and rotatable movement of the shaft 20. A coil spring 30 is coaxially located on a rear portion of the shaft 20 and extends between a shaft enlarged end portion 32 and the rear face of between the rear face of a pinion gear 35. The coil spring 30 maintains the shaft 20 in an axial rearwardmost position. A rotor component 38 is affixed to the front end 21 of the shaft 20 by way of a nut 21. The rotor 38 has a front face 39 which opposes the inner surface 15 of the reel cover 14 as well as the reel line opening 13 associated therewith. A circular skirt portion 40 extends axially rearwardly from the rotor front face 39 and includes a line pickup pin 46 extending therefrom.

A reel drive gear 34 is rotatably mounted in the gear cavity 26 and is operatively connected to a reel handle assembly 36. The drive gear 34 drivingly engages the pinion gear 35 mounted on the shaft 20. Rotation of the drive gear 34 by the handle assembly 36 rotates the pinion gear 35 and shaft 20 which causes the rotor 38 to rotate around a line spool 40. Similarly, when the reel pushbutton 11 is pressed, a pushbutton engagement surface 17 bears against the shaft end 32 and causes displacement of the shaft 20 and its connected rotor 38 forwardly within the spool cavity 28.

The line spool 41 is mounted on the shaft 20 in the spool cavity 28, but is fixed in place within the cavity so as to prevent any rotation thereof. The line spool 41 has an annular channel 45 located between two opposing spool flanges 42, 43. This channel stores a desired length of fishing line 44 which is coiled around it. As is conventional, after the line is cast from the reel, the handle is turned to rotate the rotor and the line pick-up pin 46 engages the line 44 and coils it around the line spool 40 in the channel 45 during retrieval of the lure or bait. The rotor 38 may also include a rubber braking ring 48 located in its forward face 49 which can be urged forwardly with the rotor 38 against the reel housing inner surface 15 during casting to stop the line 44 from unwinding and stop the cast.

The foregoing structure has been previously known and is summarized to indicate the environment in which the present invention is intended to operate. As mentioned above, attempts in the past to provide a feathering device for such a spincast reel have included the use of a skirt extending from the rubber braking ring. Such a structure is shown in FIGS. 2 and 4, wherein the rotor 38 has a rubber braking ring 48 mounted thereon. The braking ring 48 has an axially extending skirt portion 60 which encircles the inner portion of the braking ring 48. In operation, when the line is cast by the fisherman, he can depress the pushbutton 11 which engages the reel shaft end portion 32 to move the rotor 38 forward, which permits line 44 to exit from the reel line opening 13. As the line 44 flies through the air, the fisherman may depress the pushbutton 11 further to move the rotor 38 and feathering skirt 60 closer to the inner surface 15 of the reel housing 44, as represented by the dotted line of FIG. 4. Theoretically, the line 44 rubs against the feathering skirt 60 which applies friction, or a drag to the line 44 and slows down the cast and reduces the length of the cast. However, because the skirt 60 is a continuous structure, the skirt 60 is not able to deflect in the direction of unwinding of the line 44 and jerking of the line or bait may result from an abrupt stopping of the line 44.

Turning now to FIG. 5, a feathering device, generally designated 100, constructed in accordance with the principles of the present invention, is shown in place upon a rotor 38. The feathering device 100 includes a generally circular base member 102 preferably constructed from a pliable material, such as rubber. The base member 102 has an interference means 104, having a plurality of discrete, elongated line engaging members 105, illustrated as bristles 106 axially extending outwardly from the rotor face 39 and base member 102 toward the inner surface 15 of the reel cover 14. The base member may have a generally conical configuration and preferably a frustoconical configuration, either of which are generally complementary to the contour of the reel cover inner surface 15.

The bristles 106 extend away from the base member 102 and, as such, the bristles 106 move forwardly and rearwardly in unison with the rotor 38 when pressure applied to or withdrawn from the pushbutton 11. As best shown in FIGS. 7 and 8, when the pushbutton 11 is depressed, the rotor 38 is moved forward within the spool cavity 28 and the bristles 106 are extended toward the reel cover inner surface 15. As the distance between the reel cover 14 and the rotor front face 39 closes, each bristle 106 presents a discrete line engagement or interference surface to the fishing line 44. As the line 44 uncoils from the line spool 41, the line 44 contacts the bristles 106, sequentially.

Because of the spacing between adjacent bristles 106, each bristle 106 applies a slight amount of friction or drag to the line 44. The spacing between bristles further permits each bristle 106 to deflect when it is contacted by the line 44 and thus the likelihood of abruptly stopping or snagging the uncoiling line 44 is reduced. The deflection of the bristles 106 by the line 44 will be greatest at the bristle tips 107 and will be less near the base 108 of the bristles 106. Thus, as the rotor 38 is moved closer to the reel cover inner surface 15, the amount of friction applied to the bristles 106 is increased. Thus, a fisherman can selectively control the feathering device 100 by increasing or decreasing the pressure on the reel pushbutton 11.

Preferred results have been obtained from the bristle arrangement of FIG. 9 where the bristles 106 are angled toward the center of the feathering device 100 as shown by $\theta_1$ in FIG. 5A. Additionally, the bristles 106 can be arranged on the base member with a compound angle where they are not only angled toward the center of the base member 102 but also are angled at a second angle $\theta_2$ (FIG. 8) in the direction in which the line 44 uncoils, shown clockwise in FIG. 9. The line engaging members 105 may be formed in a variety of ways. For example, they may be inserted individually into the base member 102 from either the front or rear faces thereof by way of a needle device, they may be molded in place with the base member 102, they may be inserted as pairs of individual strands or bristles or electrostatically flocked onto the base member 102. The bristles 106 may be formed from a variety of suitable resilient materials which have the ability to deflect when engaged by the fishing line 44. Such materials include rubber, natural fibers such as hemp and the like, synthetic materials such as plastic or even natural hair. Fine metal wire strands may also be used for the bristles provided they are resilient enough to deflect when contacted by the line and return to their original shape after the contact.

The configuration of the base member 102 may also define a braking surface 110 interior of the bristles 106. This braking surface 110 is similar in function to the conventional braking ring 48 described above in that it will contact the reel opening 13 when the pushbutton is completely depressed and the rotorhead 38 is displaced fully forwardly. To assist in the braking action of the base member 102, a frustoconical insert 112 (FIG. 7) may be present on the reel housing inner surface 15.

It has been found through use of the feathering device of the present invention that one is able to exert a greater degree of control on the feathering action during a cast than with the prior art device shown in FIGS. 3 and 4. This greater control is believed to be the result of the feathering device providing a plurality of discrete line engaging members each of which is free to deflect under contact by the fishing line, which mimics the application of friction by hand on a conventional spinning or baitcasting reel. The present invention virtually eliminates any occurrence of the line or bait "jerking" backward in flight when applied.

The preferred embodiments of the present invention have been shown and described for the purpose of illustration, not limitation. It will be understood that various changes and modifications may be made without departing from the true spirit and scope of the invention.

I claim:

1. In a fishing reel having a reel body, a reel cover portion, a shaft extending through the reel body, a line spool mounted on the shaft and arranged to hold a predetermined length of fishing line, a rotor mounted on said shaft, the rotor being selectively rotatable and capable of being axially displaced within said reel by exertion of pressure on a button member, the improvement comprising means for selectively feathering the line as it is cast, the feathering means including a plurality of discrete line engaging means disposed on said rotor, the line engaging means axially extending from said rotor toward a line opening in said reel cover portion, said line engaging means including a plurality of spaced apart bristles.

2. The fishing reel of claim 1, wherein said feathering means includes a pliable base member.

3. The fishing reel of claim 1, wherein said line engaging means are angularly disposed with respect to a front surface of said rotor.

4. The fishing reel of claim 1, wherein said line engaging means are formed from a resilient material selected from the group consisting of natural fibers, synthetic fibers, rubber, hair and metal.

5. The fishing reel of claim 1, wherein said feathering means includes a base member having a generally conical configuration.

6. The fishing reel of claim 1, wherein said bristles of said line engaging means engage said line during casting when pressure is exerted upon said button member.

7. In a fishing reel of the type having a elongated shaft member axially extending within the reel, a line spool mounted on the shaft and fixed against rotation, a rotor which is selectively rotatably mounted on said shaft, and a reel cover member enclosing said shaft, line spool and rotor, the reel cover member having a line opening generally aligned with said shaft, the rotor having a face portion disposed generally perpendicularly to said shaft, said rotor face portion generally opposing an inner surface of said reel cover member and being separated from said reel cover member inner surface by a predetermined spacing, said reel including manually activated means for displacing said rotor forwardly within said reel toward said reel cover member inner surface, said reel further including means for selectively engaging a fishing line uncoiling from said line spool and exiting said reel through said reel opening, the improvement comprising the fishing line engagement means including a plurality of elongated discrete strands disposed on said rotor front face and axially extending therefrom whereby, when said displacement means is activated, the strands are moved into said predetermined spacing to present a plurality of line engagement surfaces to said fishing line as it uncoils from said line spool.

8. The fishing reel of claim 7, wherein said line engagement means includes a base member and said strands are disposed on said base member in a generally circular pattern.

9. The fishing reel of claim 8, wherein said base member has a generally conical configuration and is formed from a pliable material.

10. The fishing reel of claim 7, wherein said strands include a plurality of bristles.

11. The fishing reel of claim 10, wherein said line-engagement means includes a base member and said bristles are angularly disposed with respect to said base member.

12. The fishing reel of claim 10, wherein said bristles are angularly disposed with respect to said rotor face.

13. The fishing reel of claim 10, wherein said bristles are formed from one or more of the materials selected from the group consisting of natural fibers, synthetic fibers, rubber and hair.

14. The fishing reel of claim 7, wherein said reel cover inner surface includes a insert member generally surrounding said line opening.

15. The fishing reel of claim 7, wherein said strand means are angularly disposed on said rotor.

16. A feathering device for use on a fishing reel having a fixed line spool containing a predetermined of fishing line thereon and a rotatable fishing reel rotor assembly which is selectively rotatable about a central axis of the reel by a handle assembly and which is axially displaced within said reel by an actuation assembly, the line spool and the rotor assembly being disposed within a cavity defined by a cover member of said reel, the feathering device comprising a base member which attaches to said rotor member and a plurality of discrete, flexible and deflectable line engaging members axially extending outwardly therefrom in a preselected pattern, the line engaging means further extending generally toward a line opening disposed in said cover member, said line engaging means selectively engaging said line and deflecting when said rotor assembly is displaced by said actuation assembly.

17. The feathering device of claim 16, wherein said line engaging means includes spaced apart bristles formed from a material selected from the group consisting essentially of natural fibers, synthetic fibers and hairs.

18. The feathering device of claim 16, wherein said line engaging means extend angularly outwardly from said base member and are disposed thereon in a generally circular pattern.

19. The feathering device of claim 16, wherein said line engaging means includes a plurality of flexible bristles and said base member is generally conical ,the base member including a braking surface disposed thereon interior of said bristles, said braking surface substantially completely contacting said line opening when said rotor assembly is fully displaced within said reel cavity by said actuation assembly.

20. The feathering device of claim 16, whereon each of said line engaging means is angled toward said line opening.

21. The feathering device of claim 20, wherein each of said line engaging means is further angled in a direction the same as that which said line uncoils from said line spool.

22. The feathering device of claim 16, wherein said base member has a frustoconical configuration.

23. A feathering device for a fishing reel having a fixed line spool and a rotatable reel rotor, the line spool and reel rotor being mounted on a shaft of said reel, the shaft defining an axis of said fishing real, the feathering device comprising line engagement means selectively displaceable into a path of fishing line unwinding from said line spool and exiting from said reel, the line engagement means including a plurality of discrete, elongated deflectable strands axially disposed on said reel ahead Of said line spool and reel rotor, the strands being both axially and circumferentially deflectable with respect to a front surface of said rotor.

24. The feathering device of claim 23, wherein said deflectable strands include a plurality of bristles angularly disposed with respect to said reel axis.

25. An improved feathering device for a fishing reel of the type wherein a fishing line is discharged from a coil on a stationary spool contained within a reel housing, said spool having an axis which is generally perpendicular to the axis of said coil, said reel being adapted to be mounted to a fishing rod having a longitudinal axis in a manner wherein the axis of said coil is in general alignment with the longitudinal axis of said fishing rod, an aperture in said housing disposed generally forwardly of said reel, line engagement means disposed between the forward end of said spool and said aperture, said line engagement means being mounted to a forward end surface of a rotor, means for moving said rotor in an axial direction between said forward end of said spool and said aperture, said line engagement means including a plurality of individual flexible strands which are arranged in a predetermined pattern around said forward end surface of said rotor and are both axially and circumferentially deflectable with respect to said rotor forward end surface, said individual strands and rotor being selectively axially moveable during a cast so as to provide controlled contact with the fishing line as it is discharged from said spool through said aperture, whereby activation of the means for selectively moving said rotor enables said individual flexible strands to sequentially engage said line during a cast and provide intermittent contact with said line and improved feathering thereof.

26. The feathering device of claim 25, wherein said strands are arranged in a generally circular pattern.

27. In a fishing reel having a reel body, a reel cover portion, a shaft extending through the reel body, a line spool mounted on the shaft and arranged to hold a predetermined length of fishing line, a rotor mounted on said shaft, the rotor being selectively rotatable and capable of being axially displaced within said reel by exertion of pressure on a button member, the improvement comprising means for selectively feathering the line as it is cast, the feathering means including a plurality of discrete line engaging means disposed on said rotor, the line engaging means axially extending from said rotor toward a line opening in said reel cover portion, the feathering means including a base member having a generally conical configuration.

28. A feathering device for use on a fishing reel having a fixed line spool containing a predetermined of fishing line thereon and a rotatable fishing reel rotor assembly which is selectively rotatable about a central axis of the reel by a handle assembly and which is axially displaced within said reel by an actuation assembly, the line spool and the rotor assembly being disposed within a cavity defined by a cover member of said reel, the feathering device comprising a base member which attaches to said rotor member and a plurality of discrete line engaging members axially extending outwardly therefrom in a preselected pattern, the line engaging means further extending generally toward a line opening disposed in said cover member and further being angled toward said line opening, said line engaging means selectively engaging said line when said rotor assembly is displaced by said actuation assembly.

29. A feathering device for a fishing reel having a shaft which defines an axis of the fishing reel, a line spool fixed to slid shaft and a rotor rotatably mounted on said shaft which rotates around the line spool, the feathering device comprising: line engagement means displacement into a path of line exiting from said fishing reel off of said line spool, the line engagement means including a plurality of discrete, elongated deflectable bristles angularly disposed on said rotor with respect to said fishing reel axis.

* * * * *